May 8, 1923.
G. S. LANE
FLUID PRESSURE BRAKE
Filed April 30, 1921
1,454,547
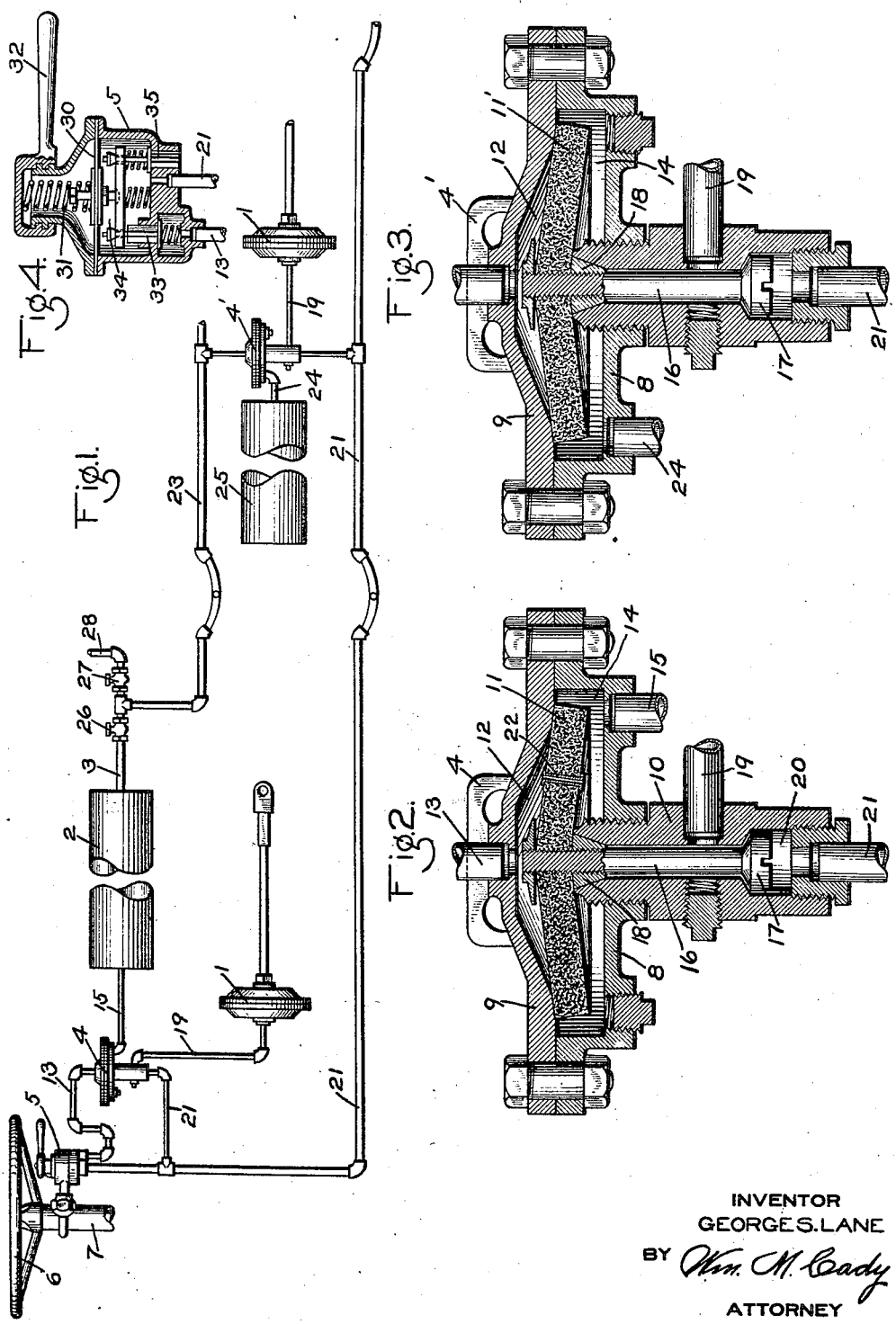
INVENTOR
GEORGE S. LANE
BY *Wm. M. Cady*
ATTORNEY Patented May 8, 1923.

1,454,547

UNITED STATES PATENT OFFICE.

GEORGE S. LANE, OF SAN FRANCISCO, CALIFORNIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed April 30, 1921. Serial No. 465,936.

*To all whom it may concern:*

Be it known that I, GEORGE S. LANE, a citizen of the United States, residing at San Francisco, in the county of San Francisco and State of California, have invented new and useful Improvements in Fluid-Pressure Brakes, of which the following is a specification.

This invention relates to fluid pressure brakes, and more particularly to a fluid pressure brake system for motor vehicles.

One object of my invention is to provide a compact brake controlling valve device of few parts and adapted to be cheaply manufactured.

Other objects and advantages will appear in the following more detailed description of the invention.

In the accompanying drawings; Fig. 1 is a diagrammatic view of a fluid pressure brake system for a motor vehicle truck and a trailer, with my invention embodied therein; Fig. 2 a central sectional view of the brake controlling valve device for a motor vehicle truck; Fig. 3 a central sectional view of the brake controlling valve device for a trailer; and Fig. 4 a central sectional view of the brake valve device.

As shown in Fig. 1, the truck brake equipment may comprise a diaphragm brake cylinder 1, a reservoir 2 adapted to be maintained charged with fluid under pressure by way of supply pipe 3, a brake controlling valve device 4, and a brake valve device 5 preferably associated with the steering wheel 6 and steering post 7.

According to my invention, the brake controlling valve device 4 may comprise a chambered casing member 8, a cap member 9, and a valve seat member 10 which is screwed into the casing member 8 at its central portion.

Within the casing, there is provided a flexible disk 11, preferably of soft rubber, the chamber 12 at one side being connected to a pipe 13 leading to the brake valve 5 and the chamber 14 at the opposite side being connected to pipe 15, leading to the supply reservoir 2.

Centrally secured to the disk 11 is a valve stem 16, which extends into a central bore provided in the valve seat member 10 and at the outer end of the stem 16 is a valve head 17 adapted to engage a seat provided in the member 10. Adjacent to the disk 11, the stem 16 is provided with a cone valve 18 adapted to engage a corresponding seat in the member 10.

The bore in the member 10, intermediate the valves 17 and 18 is connected by pipe 19 to the diaphragm brake cylinder 1, and the chamber 20 containing the valve 17 is connected to a straight air pipe 21, leading to the brake valve 5.

The disk 11 of the brake controlling valve device for the truck is provided with a restricted port connecting the opposite sides of the disk, preferably by means of a metal tube 22.

On the trailer, the chamber 12 of the brake controlling valve device 4' is connected to a reservoir pipe line 23 and the chamber 14 by a pipe 24 to an auxiliary reservoir 25. In this case, the disk 11' is not provided with a restricted port. Otherwise, the construction and the piping connections are the same as the truck controlling valve device.

The brake valve device 5 is preferably of the type set forth in my prior pending application, Serial No. 448,884, filed March 1, 1921, and as shown in Fig. 4, may comprise a casing containing a diaphragm 30, subject on one side to the pressure of a spring 31, the compressive force of which may be adjusted by the rotation of a handle 32. The diaphragm 30 operates a supply valve 33 for controlling communication from pipe 13 to chamber 34, which is connected to the straight air pipe 21 and the diaphragm also operates an exhaust valve 35.

The pipe 23 is connected to the reservoir supply pipe 3 between check valves 26 and 27, the check valve 26 preventing loss of pressure from the reservoir 2, in case of breakage of the pipe line 23, and the check valve 27 preventing back flow from the reservoir pipe line 23 to the pipe 28, through which fluid under pressure is supplied from a source of pressure to the reservoir 2.

In operation, if it is desired to effect an application of the brakes, the handle of the brake valve 5 is turned to a position corresponding with the pressure desired in the brake cylinder.

If the spring 31 of the brake valve is adjusted by the movement of the brake valve handle 32 for a pressure of thirty pounds, for example, then the supply valve 33 of the brake valve will be opened to admit fluid from pipe 13 to the straight air pipe 21. Fluid under pressure will then flow from the reservoir 2 through pipe 15 to chamber 14 and thence through the restricted port in the tube 22 to chamber 12. If the rate at which fluid is supplied from chamber 12 through the brake valve 5 to the straight air pipe 21 is less than the rate at which fluid can flow through the restricted port, then the disk 11 will remain in the normal position, as shown in Fig. 2 and fluid under pressure will be supplied through the straight air pipe 21 to chamber 20 of the brake controlling valve device 4 and thence past the open valve 17 to pipe 19 and the diaphragm brake cylinder 1.

If the rate of flow to the straight air pipe exceeds the capacity of the restricted port through the disk 11, then the disk will be flexed by the greater fluid pressure in chamber 14, so as to operate the stem 16 and close the valve 17, at the same time opening the valve 18. Fluid under pressure will now flow directly from the reservoir 2, through chamber 14 to the brake cylinder 1.

The reduction in pressure in the reservoir 2 by flow to the brake cylinder produces a reduction in pressure in the reservoir line 23 by back flow of the higher pressure in said line through the check valve 26 to the reservoir and as a consequence, the disk 11' of the brake controlling valve device on the trailer is flexed by the higher auxiliary reservoir pressure on the opposite side of the disk, so as to operate the valve stem 16 to close valve 17 and open valve 18. Fluid under pressure is then supplied from the auxiliary reservoir on the trailer to the brake cylinder to effect an application of the brakes.

It will now be evident that a prompt application of the brakes will be obtained, since if a rapid flow is necessary, the disk 11 will automatically operate to open a direct communication from the reservoir to the brake cylinder by way of the valve 18, at the same time causing quick serial action on the trailer.

When the pressure in the straight air pipe 21 has been increased to the setting of the brake valve 5, the supply valve 33 of the brake valve will close, permitting the fluid pressures on opposite sides of the disk 11 to equalize, so that the disk will be maintained in its normal position through the tendency of the disk to flatten out in a direction to seat the valve 18.

If there should be any leakage from the brake cylinder or the straight air pipe 21, the brake valve will automatically operate to restore the pressure to the setting of the brake valve.

The brakes may be released by moving the brake valve to release position, in which fluid is released from the brake cylinder through the straight air pipe 21 and the exhaust port of the brake valve.

On the trailer, when the system is charged with fluid under pressure, the fluid at reservoir pressure supplied to the pipe 23 flows to chamber 12 of the brake controlling valve device 4' and the pressure of fluid in said chamber then acts on the disk 11' to force the peripheral seat portion away from its normal seat on the cap 9, so that fluid is supplied past the disk to the chamber 14, charging the auxiliary reservoir 25 with fluid under pressure.

When the brakes are applied by operating the brake valve 5 on the truck, fluid supplied to the straight air pipe 21 flows past the open valve 17 to the pipe 19 and the brake cylinder 1 on the trailer.

Since the fluid pressures on opposite sides of the disk 11' remain balanced normally, the brakes are normally applied by fluid supplied through the straight air pipe. If, however, the trailer should break away from the truck or should the pipe 23 become broken from any other cause, the sudden reduction in pressure thus produced in the chamber 12 of the brake controlling valve device will cause the disk 11' to be moved by the higher pressure in chamber 14, so as to operate the stem 16, thereby closing the valve 17 and opening the valve 18.

Fluid under pressure is thus supplied from the auxiliary reservoir 25 past the valve 18 to the brake cylinder to effect an application of the brakes.

The disk 11 being of soft rubber, if the pipe 13 on the truck should break or should a sudden reduction in pressure in chamber 12 be otherwise produced, the disk 11 will be flexed so as to seat against the inner wall of the cap 9, and seal off the restricted port through the disk. This action then prevents loss of pressure from the reservoir 2 and also from the brake cylinder.

In this case, the brakes may be released by bleeding the reservoir 2, so as to permit the return of the disk 11 to normal position.

Having now described my invention, what I claim as new and desire to secure by Letters Patent, is:

1. In a fluid pressure brake, the combination with a brake cylinder and a straight air pipe, of a brake controlling valve device comprising a flexible resilient disk and a valve operated by said disk for controlling communication from the straight air pipe to the brake cylinder.

2. In a fluid pressure brake, the combination with a brake cylinder, of a brake controlling valve device comprising a marginally free flexible resilient disk and means operated by said disk for controlling the supply of fluid to the brake cylinder.

3. In a fluid pressure brake, the combination with a brake cylinder, of a brake controlling valve device comprising means for controlling the supply of fluid to the brake cylinder and a flexible disk having its marginal portion unconfined and operated by fluid under pressure for actuating said means.

4. In a fluid pressure brake, the combination with a brake cylinder and a normally charged source of fluid under pressure, of a valve for controlling communication from said source to the brake cylinder and a marginally free flexible resilient disk operated by fluid under pressure for actuating said valve.

5. In a fluid pressure brake, the combination with a brake cylinder, a straight air pipe, and a source of fluid under pressure, of a valve for controlling communication from the straight air pipe to the brake cylinder, a vlave for controlling communication from said source of pressure to the brake cylinder, and a flexible resilient disk operated by fluid under pressure for actuating said valves.

6. In a fluid pressure brake, the combination with a brake cylinder, a straight air pipe, and a source of fluid under pressure, of a valve for controlling communication from the straight air pipe to the brake cylinder, a valve for controlling communication from said source of pressure to the brake cylinder, and a flexible resilient disk normally operative to hold the straight air pipe controlling valve open and operative upon being flexed from normal position to close said valve and open the source of pressure controlling valve.

7. In a fluid pressure brake, the combination with a brake cylinder, a straight air pipe, and a source of fluid under pressure, of a flexible resilient disk having one side connected to the source of pressure, means operated by said disk for controlling communication from the straight air pipe and the source of fluid under pressure to the brake cylinder, and a brake valve device for controlling the supply of fluid from the source of pressure through a restricted port to the opposite side of said disk and thence to the straight air pipe.

8. In a fluid pressure brake, the combination with a brake cylinder, of a pipe adapted to be charged with fluid under pressure, a reservoir adapted to be charged from said pipe, a resilient disk having a marginal seat for controlling communication from the pipe to the reservoir, and means operated by said disk for controlling the supply of fluid to the brake cylinder.

9. In a fluid pressure brake, the combination with a brake cylinder, of a pipe normally charged with fluid under pressure, a reservoir, a resilient disk subject to the opposing pressures of said pipe and the reservoir and adapted to be marginally flexed to permit the flow of fluid from said pipe to the reservoir, and means operated by said disk for controlling the supply of fluid to the brake cylinder.

10. In a fluid pressure brake, the combination with a brake cylinder, of a pipe normally charged with fluid under pressure, a reservoir, a resilient disk subject to the opposing pressures of said pipe and the reservoir and adapted to be marginally flexed to permit the flow of fluid from said pipe to the reservoir, and means operated by the central flexing of the disk for establishing communication from the reservoir to the brake cylinder.

11. In a fluid pressure brake, the combination with a brake cylinder, a reservoir charged with fluid under pressure, and a straight air pipe, of a flexible resilient disk, a valve stem secured to said disk, a valve on said stem for controlling communication from the reservoir to the brake cylinder, and a valve on said stem for controlling communication from the straight air pipe to the brake cylinder.

12. In a fluid pressure brake, the combination with a reservoir on a vehicle, of a pipe connected to said reservoir and a brake controlling valve device on a trailer vehicle operated upon a reduction in pressure in said reservoir and pipe for effecting an application of the brakes on the trailer vehicle.

13. In a fluid pressure brake, the combination with a reservoir on a leading vehicle and means for controlling the supply of fluid from said reservoir to effect an application of the brakes on said vehicle, of a pipe connected to said reservoir and a brake controlling valve device on a trailer vehicle connected to said pipe and operated upon a reduction in pressure in said reservoir and pipe for effecting an application of the brakes on the trailer vehicle.

In testimony whereof I have hereunto set my hand.

GEORGE S. LANE.